(12) United States Patent
Barr et al.

(10) Patent No.: US 7,685,591 B2
(45) Date of Patent: Mar. 23, 2010

(54) CUSTOMIZING A SOFTWARE APPLICATION THROUGH A PATCH FILE

(75) Inventors: Paul C. Barr, Redmond, WA (US); Aidan T. Hughes, Bellevue, WA (US); John P Jennings, Everett, WA (US); Shane A Morrison, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 802 days.

(21) Appl. No.: 11/020,025

(22) Filed: Dec. 20, 2004

(65) Prior Publication Data

US 2006/0136895 A1 Jun. 22, 2006

(51) Int. Cl.
*G06F 9/44* (2006.01)
*G06F 9/445* (2006.01)

(52) U.S. Cl. .............. 717/169; 717/173; 717/175; 717/178; 709/221

(58) Field of Classification Search ......... 717/105–109, 717/168–178, 100, 107, 112, 163; 709/203, 709/220–223
See application file for complete search history.

(56) References Cited

U.S. PATENT DOCUMENTS

| | | | | |
|---|---|---|---|---|
| 5,325,533 | A | * 6/1994 | McInerney et al. | 717/107 |
| 5,680,619 | A | * 10/1997 | Gudmundson et al. | 717/108 |
| 5,956,481 | A | * 9/1999 | Walsh et al. | 726/23 |
| 6,073,214 | A | 6/2000 | Fawcett | |
| 6,161,218 | A | * 12/2000 | Taylor | 717/174 |
| 6,256,668 | B1 | * 7/2001 | Slivka et al. | 709/220 |
| 6,266,811 | B1 | 7/2001 | Nabahi | |
| 6,487,713 | B1 | * 11/2002 | Cohen et al. | 717/105 |
| 6,601,233 | B1 | * 7/2003 | Underwood | 717/102 |
| 6,854,061 | B2 | 2/2005 | Cooper et al. | |
| 6,931,625 | B1 | * 8/2005 | Coad et al. | 717/109 |
| 6,934,933 | B2 | 8/2005 | Wilkinson et al. | |
| 6,957,256 | B1 | 10/2005 | Bradley et al. | |
| 6,968,539 | B1 | 11/2005 | Huang et al. | |
| 6,993,657 | B1 | 1/2006 | Renner et al. | |
| 7,000,230 | B1 | 2/2006 | Murray et al. | |
| 7,007,278 | B2 | 2/2006 | Gungabeesoon | |
| 7,043,715 | B1 | 5/2006 | Bauer et al. | |
| 7,055,146 | B1 | * 5/2006 | Durr et al. | 717/162 |
| 7,073,126 | B1 | 7/2006 | Khandekar | |
| 7,073,172 | B2 | * 7/2006 | Chamberlain | 717/169 |
| 7,100,159 | B2 | 8/2006 | Claiborne | |
| 7,127,712 | B1 | * 10/2006 | Noble et al. | 717/173 |
| 7,149,789 | B2 | 12/2006 | Slivka et al. | |
| 7,174,370 | B1 | 2/2007 | Saini et al. | |

(Continued)

OTHER PUBLICATIONS

Bainbridge, et al., "Assembling and Enriching Digital Library Collections", IEEE Computer Society, May 2003, pp. 323-334.

(Continued)

*Primary Examiner*—Wei Y Zhen
*Assistant Examiner*—Ryan D Coyer
(74) *Attorney, Agent, or Firm*—Lee & Hayes, PLLC

(57) ABSTRACT

An integrated application setup enables the implementation of application customizations through patch technology. A customization patch extends a typical patch file format such that the customization patch serves as a container for application customization data useful for customizing an application using different underlying technologies. The contents of the customization patch can include transforms, cabinet files, and XML content containing customization information.

14 Claims, 4 Drawing Sheets

U.S. PATENT DOCUMENTS

| | | |
|---|---|---|
| 7,191,436 B1 * | 3/2007 | Durr et al. .................. 717/170 |
| 7,210,097 B1 | 4/2007 | Clarke et al. |
| 7,559,058 B2 * | 7/2009 | Blumfield et al. ........... 717/172 |
| 2002/0124245 A1 | 9/2002 | Maddux et al. |
| 2003/0009429 A1 | 1/2003 | Jameson |
| 2003/0033597 A1 * | 2/2003 | Allsop et al. ................ 717/169 |
| 2003/0145317 A1 * | 7/2003 | Chamberlain ............... 717/177 |
| 2003/0167463 A1 * | 9/2003 | Munsil et al. ............... 717/170 |
| 2003/0225866 A1 * | 12/2003 | Hudson ..................... 709/221 |
| 2004/0199615 A1 | 10/2004 | Philyaw |
| 2004/0225671 A1 | 11/2004 | Carroll et al. |
| 2005/0132179 A1 | 6/2005 | Glaum et al. |
| 2005/0193389 A1 | 9/2005 | Murphy et al. |
| 2005/0257208 A1 * | 11/2005 | Blumfield et al. ........... 717/168 |
| 2005/0273461 A1 | 12/2005 | Jameson |
| 2006/0031407 A1 | 2/2006 | Dispensa et al. |
| 2007/0055707 A1 | 3/2007 | Dandekar et al. |
| 2007/0174834 A1 | 7/2007 | Purkeypile et al. |
| 2008/0021778 A1 | 1/2008 | Perkowski et al. |

OTHER PUBLICATIONS

Shegalov, et al., "XML-enabled workflow management for e-services across heterogenous platforms", Springer-Verlag New-York, inc, Apr. 27, 2001, pp. 91-103.

Weber, et al.., "Live Documents with Contextual, Data-Driven Information Components", ACM, Oct. 2002, pp. 236-247.

* cited by examiner

CUSTOMIZING A SOFTWARE APPLICATION THROUGH A PATCH FILE

TECHNICAL FIELD

The present disclosure generally relates to customizing applications, and more particularly, to customizing applications through patch files.

BACKGROUND

Prior to installation on a computer, most applications are customized to better suit the needs of the user. Customizing an application is to set or change features of the application based, for example, on a user's individual desires or based on customization needs determined by an administrator for a given user environment having many users. Customizing applications provides a consistent experience for users and reduces problems users have interacting with the software. Accordingly, software applications are generally deployed in a very specific manner. As an example, applications that an individual can purchase, download, and install from a Web site are typically customized by the vendor to include particular settings, preferences, defaults, etc., that are most likely to be useful to a typical end-user. In a different scenario, administrators responsible for deploying applications to client computers across large organizations typically pre-configure customizations in a manner to best suit various targeted groups of users. For example, for a particular application, an administrator may implement customization settings for users in an accounting department that are different than the customization settings implemented for users in an engineering department.

Current methods for implementing application customizations have various disadvantages. For example, one exemplary method for customizing an application requires a set of tools to implement the customizations. The customization tools are not included with the application itself, but instead must be accessed separately by a user or administrator before any customizations can be made. In addition, the customization tools work separately from one another, and their applicability depends upon whether or not the application has already been installed.

In a pre-installation scenario (i.e., at application deployment time), for example, a customization installation tool is used to read information from an application installation package and present customization options to a user or administrator. The customization installation tool generates a transform based on input from a user that indicates the user's customization intent. The transform can be applied exclusively, and only one time, to the application installation package. Applying the transform to the installation package results in the software application being installed on a computer with the customizations specified during the pre-installation customization session. However, once the application is installed, the customization installation tool cannot be used again to update, alter, or fix customizations should the need arise due to an inadvertent customization mistake or customization requirements that may change over time. Furthermore, in a scenario where an administrator needs to create different deployment versions or custom installations for an application across a variety of user groups (e.g., secretaries, engineers, accountants, etc.), the customization installation tool needs to be run separately and in its entirety for each different deployment version.

In a post-installation scenario (i.e., at application maintenance time), once an application has been installed, any changes that need to be made to customizations require the use of a second, post-installation customization tool. For example, if an administrator forgets to turn off a particular setting in an application during a pre-installation customization session, he would have to start a new customization process over again, using a different post-installation customization tool. In a post-installation customization session, the post-installation customization tool generates a maintenance file that is loaded onto the computer to make changes to the application customizations according to the user's intent as entered during the post-installation customization session. Unlike the transform noted above in the pre-installation customization, the maintenance file can be used multiple times per product to make changes to the application customizations. However, each time a need arises to make additional changes to the customizations, an administrator must begin from scratch, using the post-installation customization tool to make appropriate customization alterations. Furthermore, in a scenario where an administrator needs to make varying customization changes to different deployment versions across a variety of user groups (e.g., secretaries, engineers, accountants, etc.), the post-installation customization tool needs to be run separately and in its entirety for each different deployment version.

Thus, a significant disadvantage with current customization methods is that numerous custom installations or changes to numerous custom installations require that the pre- and post-installation customization tools be run separately and in their entirety for each different custom installation or change made to a custom installation. Another disadvantage is that a user's customization intent is tied exclusively to a particular manner of implementation. Any adjustment to that customization intent requires that the particular method of implementation be exercised again in its entirety. Yet another disadvantage is the disjointed manner in which customizations are made. That is, the use of pre- and post-installation customization tools requires that a user or administrator become familiar with two different tools in order to implement customizations on an application. Other disadvantages with current customization methods are that they are not integrated with the standard setup procedures of the applications and the customization tool(s) themselves must be accessed separately from the application media.

Accordingly, a need exists for an integrated application setup that enables application customizations to be managed in both pre- and post-installation scenarios and in scenarios where different application deployment versions require varying application customizations.

SUMMARY

A system and methods provide an integrated application setup that enables the implementation of application customizations through a patch. A customization patch extends a typical patch file format and serves as a container for additional application customization data. The contents of the customization patch can include transforms, cabinet files, and XML content containing customization information.

An application installer on a client computer, for example, recognizes and executes the patch transforms in conjunction with the patch cabinet files against a targeted application installation package in order to implement customizations contained within the transforms. A separate customization process executing on the client computer (e.g., code executing from a setup routine, a custom action from the application installation package, etc.) is configured to recognize the additional customization XML content within the patch and to implement the customization directives contained in the XML content.

Customizations contained in the customization patch can be native to the application installation and thus be managed by the application installer. In addition, custom code contained within a patch transform or the customization XML can provide customizations that are not native to the application installation. Accordingly, the application installer manages the execution of the custom code which itself implements the non-native customization.

BRIEF DESCRIPTION OF THE DRAWINGS

The same reference numerals are used throughout the drawings to reference like components and features.

DETAILED DESCRIPTION

Introduction

The following discussion is directed to a system and methods that enable application customizations to be made through patches. A patch file format, typically used for updating product/application binaries, is extended to create a customization patch that includes customization information represented in a collection of underlying technologies which enable the customizations. Such technologies include, for example, custom actions built in to an application installation package and customization XML contained in the customization patch.

Advantages of the described system and methods include, for example, the ability to use established patch deployment technologies which avoids the need for an alternative customization deployment process. Another advantage includes an integrated application setup that enables application customizations to be managed at both deployment time and maintenance time.

Exemplary Computing Environment

Figure 1:
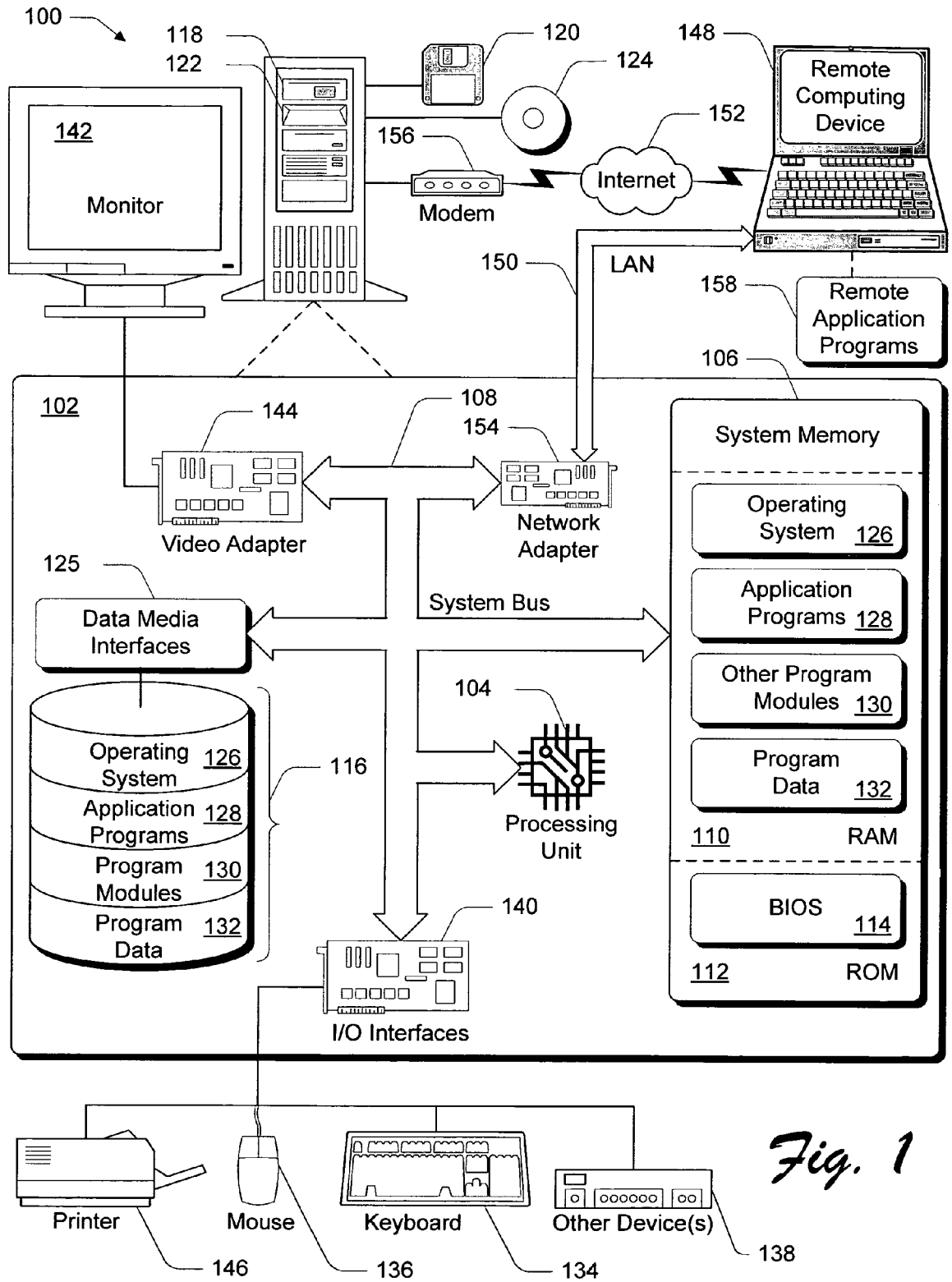
FIG. 1 illustrates an exemplary computing environment suitable for implementing application customizations through patches.

FIG. 1 illustrates an exemplary computing environment suitable for implementing application customizations through patches. Although one specific configuration is shown in FIG. 1, such computing devices may be implemented in other computing configurations.

The computing environment 100 includes a general-purpose computing system in the form of a computer 102. The components of computer 102 may include, but are not limited to, one or more processors or processing units 104, a system memory 106, and a system bus 108 that couples various system components including the processor 104 to the system memory 106.

The system bus 108 represents one or more of any of several types of bus structures, including a memory bus or memory controller, a peripheral bus, an accelerated graphics port, and a processor or local bus using any of a variety of bus architectures. An example of a system bus 108 would be a Peripheral Component Interconnects (PCI) bus, also known as a Mezzanine bus.

Computer 102 includes a variety of computer-readable media. Such media can be any available media that is accessible by computer 102 and includes both volatile and non-volatile media, removable and non-removable media. The system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 contains data and/or program modules that are immediately accessible to and/or presently operated on by the processing unit 104.

Computer 102 may also include other removable/non-removable, volatile/non-volatile computer storage media. By way of example, FIG. 1 illustrates a hard disk drive 116 for reading from and writing to a non-removable, non-volatile magnetic media (not shown), a magnetic disk drive 118 for reading from and writing to a removable, non-volatile magnetic disk 120 (e.g., a "floppy disk"), and an optical disk drive 122 for reading from and/or writing to a removable, non-volatile optical disk 124 such as a CD-ROM, DVD-ROM, or other optical media. The hard disk drive 116, magnetic disk drive 118, and optical disk drive 122 are each connected to the system bus 108 by one or more data media interfaces 125. Alternatively, the hard disk drive 116, magnetic disk drive 118, and optical disk drive 122 may be connected to the system bus 108 by a SCSI interface (not shown).

The disk drives and their associated computer-readable media provide non-volatile storage of computer readable instructions, data structures, program modules, and other data for computer 102. Although the example illustrates a hard disk 116, a removable magnetic disk 120, and a removable optical disk 124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 116, magnetic disk 120, optical disk 124, ROM 112, and/or RAM 110, including by way of example, an operating system 126, one or more application programs 128, other program modules 130, and program data 132. Each of such operating system 126, one or more application programs 128, other program modules 130, and program data 132 (or some combination thereof) may include an embodiment of a caching scheme for user network access information.

Computer 102 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 102 via input devices such as a keyboard 134 and a pointing device 136 (e.g., a "mouse"). Other input devices 138 (not shown specifically) may include a microphone, joystick, game pad, satellite dish, serial port, scanner, and/or the like. These and other input devices are connected to the processing unit 104 via input/output interfaces 140 that are coupled to the system bus 108, but may be connected by other interface and bus structures, such as a parallel port, game port, or a universal serial bus (USB).

A monitor 142 or other type of display device may also be connected to the system bus 108 via an interface, such as a video adapter 144. In addition to the monitor 142, other output peripheral devices may include components such as speakers (not shown) and a printer 146 which can be connected to computer 102 via the input/output interfaces 140.

Computer 102 may operate in a networked environment using logical connections to one or more remote computers, such as a remote computing device 148. By way of example, the remote computing device 148 can be a personal computer, portable computer, a server, a router, a network computer, a peer device or other common network node, and the like. The remote computing device 148 is illustrated as a portable computer that may include many or all of the elements and features described herein relative to computer system 102.

Logical connections between computer 102 and the remote computer 148 are depicted as a local area network (LAN) 150 and a general wide area network (WAN) 152. Such networking environments are commonplace in offices, enterprise-wide computer networks, intranets, and the Internet. When implemented in a LAN networking environment, the computer 102 is connected to a local network 150 via a network interface or adapter 154. When implemented in a WAN networking environment, the computer 102 includes a modem 156 or other means for establishing communications over the wide network 152. The modem 156, which can be internal or external to computer 102, can be connected to the system bus 108 via the input/output interfaces 140 or other appropriate mechanisms. It is to be appreciated that the illustrated network connections are exemplary and that other means of establishing communication link(s) between the computers 102 and 148 can be employed.

In a networked environment, such as that illustrated with computing environment 100, program modules depicted relative to the computer 102, or portions thereof, may be stored in a remote memory storage device. By way of example, remote application programs 158 reside on a memory device of remote computer 148. For purposes of illustration, application programs and other executable program components, such as the operating system, are illustrated herein as discrete blocks, although it is recognized that such programs and components reside at various times in different storage components of the computer system 102, and are executed by the data processor(s) of the computer.

EXEMPLARY EMBODIMENTS

Figure 2:
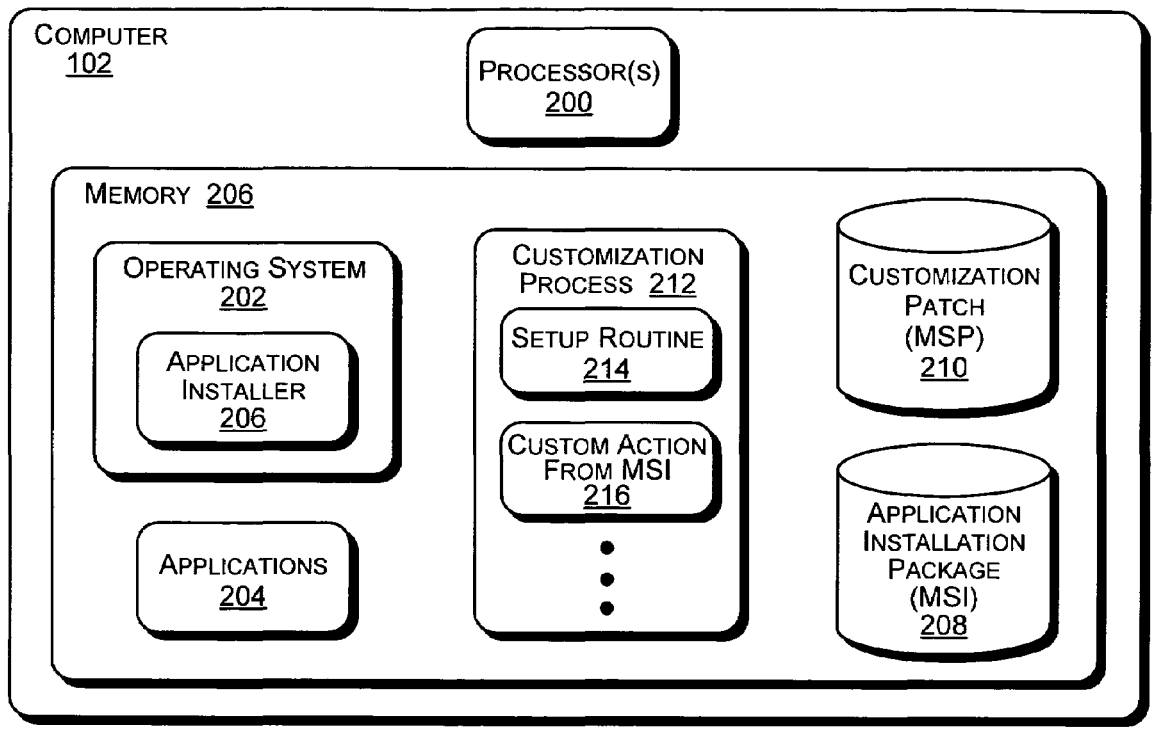
FIG. 2 illustrates an exemplary embodiment of a computer configured for implementing application customizations through patches.

FIG. 2 illustrates an exemplary embodiment of a computer 102 configured for implementing application customizations through patches. Computer 102 includes one or more processors 200 configured to execute an operating system 202 and various application programs 204 stored in a memory 206.

The operating system 202 of computer 102 is shown as including an application installer component 206. Application installer 206 is generally configured as an operating system service to install applications 204 on computer 102. Application installer 206 implements a custom installation of an application by applying transforms to a target application installation package 208 associated with the software application being installed. An application installation package 208 is a database that contains a large group of instructions that tell the application installer 206 how the application is to be installed. An example of an application installation package 208 is a Microsoft Windows Installer Package (MSI package). An MSI file contains a database that stores all the instructions and data required to manage the state of a program, such as adding, changing, or removing it from a computer 102. For example, an MSI file of an application can contain instructions for installing the application on a computer when a prior version of the application is already installed or where that application has never been present.

In addition to installing applications 204, application installer 206 is configured to implement patch technology. Traditionally, patch functionality has been used only to update application binaries for purposes such as security fixes or other program bugs. Thus, patches are typically developed and distributed to replace or be inserted into compiled code (i.e., a binary file or object module). However, in the current embodiment described here, patch functionality that is native to the application installer 206 is used to implement application customizations. Thus, custom features, settings, operating characteristics, and the like, can be implemented through the use of patch technology which has traditionally been used for repairing or updating application binaries. As discussed in more detail herein below with regard to FIG. 3, the native patch functionality of the application installer 206 is leveraged to enable application customizations through the use of a customization patch 210 having an extended patch file format that includes application customization information.

One example of an application installer 206 is Microsoft® Windows® Installer, available from Microsoft Corporation of Redmond, Wash. The Microsoft Windows Installer enables managing the state of software applications. This includes managing the installation, modification, upgrade, or removal of software applications. Thus, the installer performs functions such as modifying applications, upgrading applications, and removing applications that have been installed on a computer 102. Throughout this disclosure, application installer 206 is discussed in terms of the Microsoft Windows Installer. Accordingly, additional information regarding application installer 206 is available from Microsoft Corporation, Redmond, Wash., with reference to the Microsoft Windows Installer.

Referring again to FIG. 2, computer 102 also includes a customization process 212. Like application installer 206, customization process 212 also executes against customization patch 210. However, customization process 212 executes separately from the application installer 206, and as discussed more fully below regarding FIG. 3, it recognizes and operates against customization information (i.e., customization XML) within the customization patch 210 that application installer 206, by design, does not recognize. Thus, customization process 212 is a set of code generally configured to recognize and implement additional customization information that is contained within a customization patch 210.

Customization process 212 can be implemented in various ways. For example, customization process can be implemented as part of an application setup routine 214 such as "setup.exe". Thus, a user may initiate a setup routine 214 in a particular mode (e.g., a customization mode) that implements application customizations by recognizing and executing customization information within the customization patch 210 that the application installer 206 is not designed to recognize. Customization process 212 might also be implemented as one or more custom actions 216 installed on computer 102 from an application installation package 208. That is, a custom action 216 configured to recognize and execute customization XML from the patch file 210, may be installed on computer 102 during installation of the application installation package 208 by the application installer 206.

Figure 3:
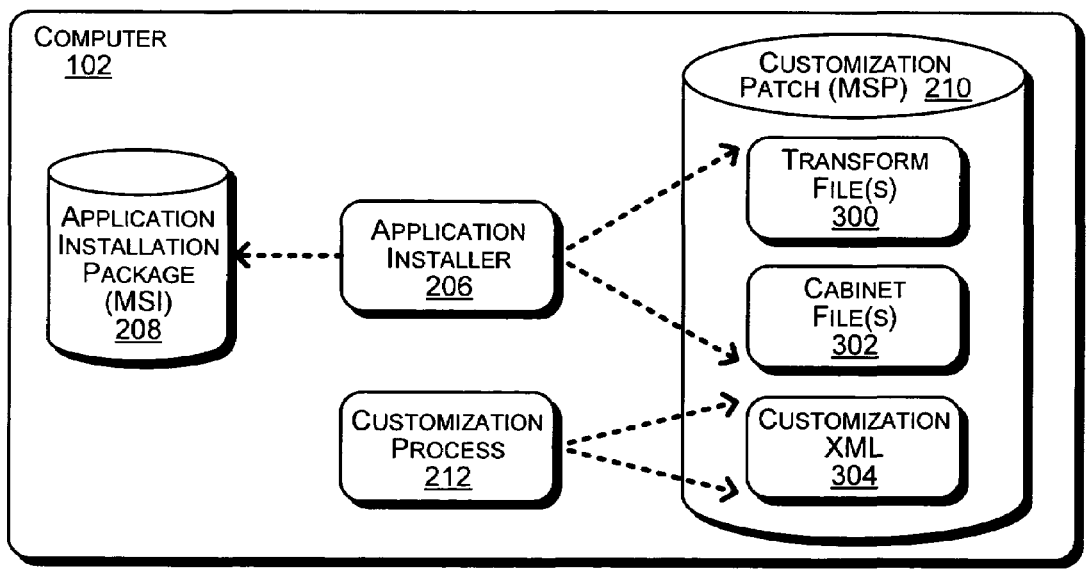
FIG. 3 illustrates additional details regarding components of a customization patch and functional aspects related to the customization patch.

FIG. 3 illustrates additional details regarding components of a customization patch 210 and functional aspects related to the customization patch 210. As shown in FIG. 3, a customization patch 210 includes transform files 300, cabinet files 302, and customization XML 304.

Traditionally, a patch provides a way to update and maintain an application 204. One example of a patch is a Windows Installer Patch file (MSP). Application installer 206 includes native capability for implementing MSP patch functionality. An MSP patch file represents an updated component of an application or portion of the application 204. Patch files are usually obtained from a software manufacturer or developer of the original application program. Traditionally, patches enable updates to existing applications without having to uninstall the product, which preserves the customizations of the application installation. Thus, in the past, patches have not included customization information for setting or changing features or characteristics of an application. Patches may change only a few bytes of a single application file, or they may change all of the files and registry keys in a product.

An MSP patch file does not include a database like a regular application installation package 208. Rather, it contains a database transform file or files configured to add information to the database of its target application installation package 208. It also contains cabinet files that application installer 206 uses to apply the patch files that are stored in the cabinet file stream of the patch file package. The files in an MSP patch are stored in an OLE structured storage format. OLE is Microsoft's framework for a compound document technology.

In the present embodiment, the customization patch 210 represents an extension of the MSP patch file format. Thus, as noted above, in addition to containing transform files 300 and cabinet files 302, customization patch 210 also contains customization XML 304. The customization patch 210 is preferably stored in a compound document format such as OLE structured storage. The customization XML 304 represents customizations contained within transforms 300. More generally, the customization XML 304 represents customization intent of a user generated, for example, through a customization user interface (not shown) that is part of an integrated application setup enabling application customizations to be managed at both application deployment time and application maintenance time. For purposes of the present disclosure, the manner in which the customization XML 304 is generated or incorporated into the customization patch 210 is immaterial and therefore will not be discussed in any further detail. In addition to representing customizations contained within transforms 300, the customization XML 304 can contain additional customization information that can be readily consumed and implemented by a customization process 212.

The customization XML 304 is generic in that it can be used to implement customization intent using various arbitrary customization technologies. For example, in the current implementation, the customization XML 304 has been consumed by Windows Installer Transform technology which generated transforms 300 that will be used by application installer 206 as discussed below to effect application customizations. The customization XML 304 can also be consumed by a customization application to display current customizations to a user through a UI and permit further customizations to be made.

FIG. 3 is intended to show how a customization patch 210 is used or consumed by components of computer 102 in the process of customizing an application. When a customization patch 210 is received, the application installer 206 (e.g., Microsoft Windows Installer), using its native patch technology functionality, accesses the patch 210 and recognizes any transforms 300 and cabinet files 302, as indicated in FIG. 3. The application installer 206 does not recognize, and therefore ignores, the customization XML 304. The application installer 206 implements the transforms 300 as it normally would in the case where it was patching binaries for the application. However, in the present embodiment, the transforms contain a set of customization changes for the application that the application installer 206 applies to the application installation package 208. Thus, instead of repairing or updating part of the application binary file with code, the patch contains customization instructions and data that are used to set or make changes to features and/or operational characteristics of the application. The types of customizations depend to some extent on the application being customized, but may include, for example, default page settings in a word processing application (e.g., margins, spacing, fonts, font sizes, etc.). Such customizations may be based, for example, on an individual user's customization desires, or on the customization needs of a given user environment serving many users as determined by an administrator. When the application installer 206 implements the transforms 300, the database of the application installation package 208 is updated using relevant data stored in the cabinet files 302, and the appropriate customization settings and features within the application are updated.

Customizations that are not part of the native functionality of the application installer 206 can also be achieved by the application installer 206 using custom code contained in a transform 300. Custom code in a transform 300 can direct the application installer 206 to make a particular application customization that is not native to the installer 206. An example of a non-native customization might be changing the organization name in an application. Suppose for instance that "Company X" has 100 client computers each having a document editing application installation. At some time, such as upon initial deployment, the document editing application is customized to indicate that Company X is the organization that owns the application. At some later time, however, "Company Y" buys Company X and wants to update the customizations for the document editing application on all the client computers. As noted above, changing the organization name is not a customization that is within the native functionality of the application installer 206. However, in the current embodiment, the customization update can be achieved by generating custom code, that when executed, will perform this non-native customization. The custom code is passed to the application installer 206 via a transform 300 contained in a customization patch 210. The application installer 206 accesses the transform 300 and executes the custom code, which instructs the installer 206 how to make the organization name update, using data from a cabinet file 302. The data in the cabinet file 302 may include, for example, the new name of the company, "Company Y".

FIG. 3 further illustrates how additional customization information within the customization XML 304 can be consumed by a customization process 212 (e.g., a setup routine 214, custom actions from an application installation package, etc.) in order to effect further application customizations and/or alter the behavior of a process on computer 102. As noted above, customization XML 304 generally provides a road map to customizations contained in the transforms 300 and implemented through the application installer 206. However, customization XML 304 can also include additional customization information that is accessible to a customization process 212. For example, a setup routine 214 initiated by a user in a customization mode may be configured to parse the customization XML and recognize and implement various instructions contained in the XML. The XML may include instructions such as instructions to alter a behavior of a particular process or instructions to make customization changes to an application. For instance, additional information in customization XML 304 could instruct setup routine 214 to change its login level from a basic level to a verbose level. When the setup routine 214 parses the XML and reads it in, it knows to toggle its login level from basic to verbose.

EXEMPLARY METHODS

Figure 4:
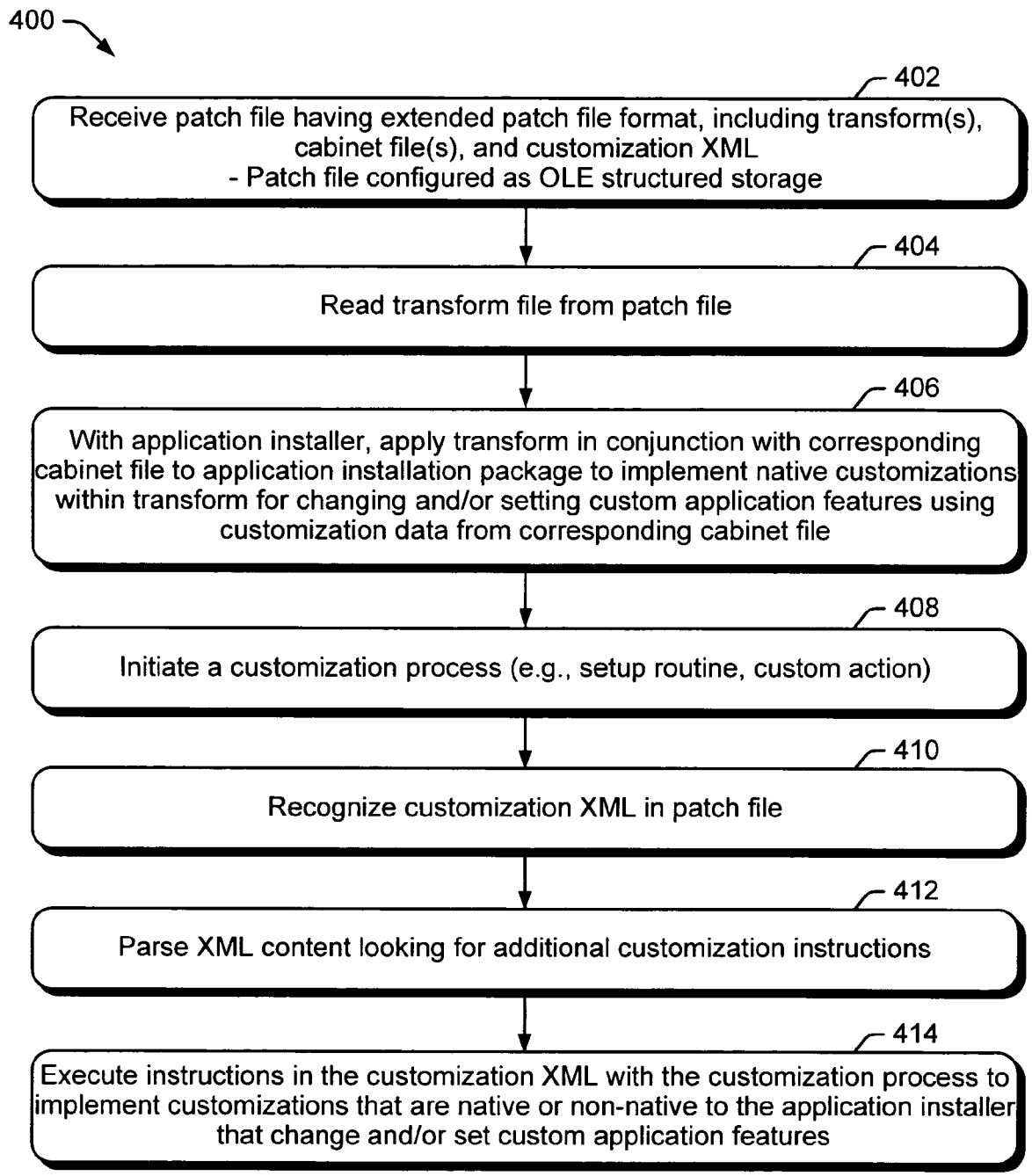
FIG. 4 is a flow diagram illustrating exemplary methods for implementing application customizations through patches.
Figure 5:
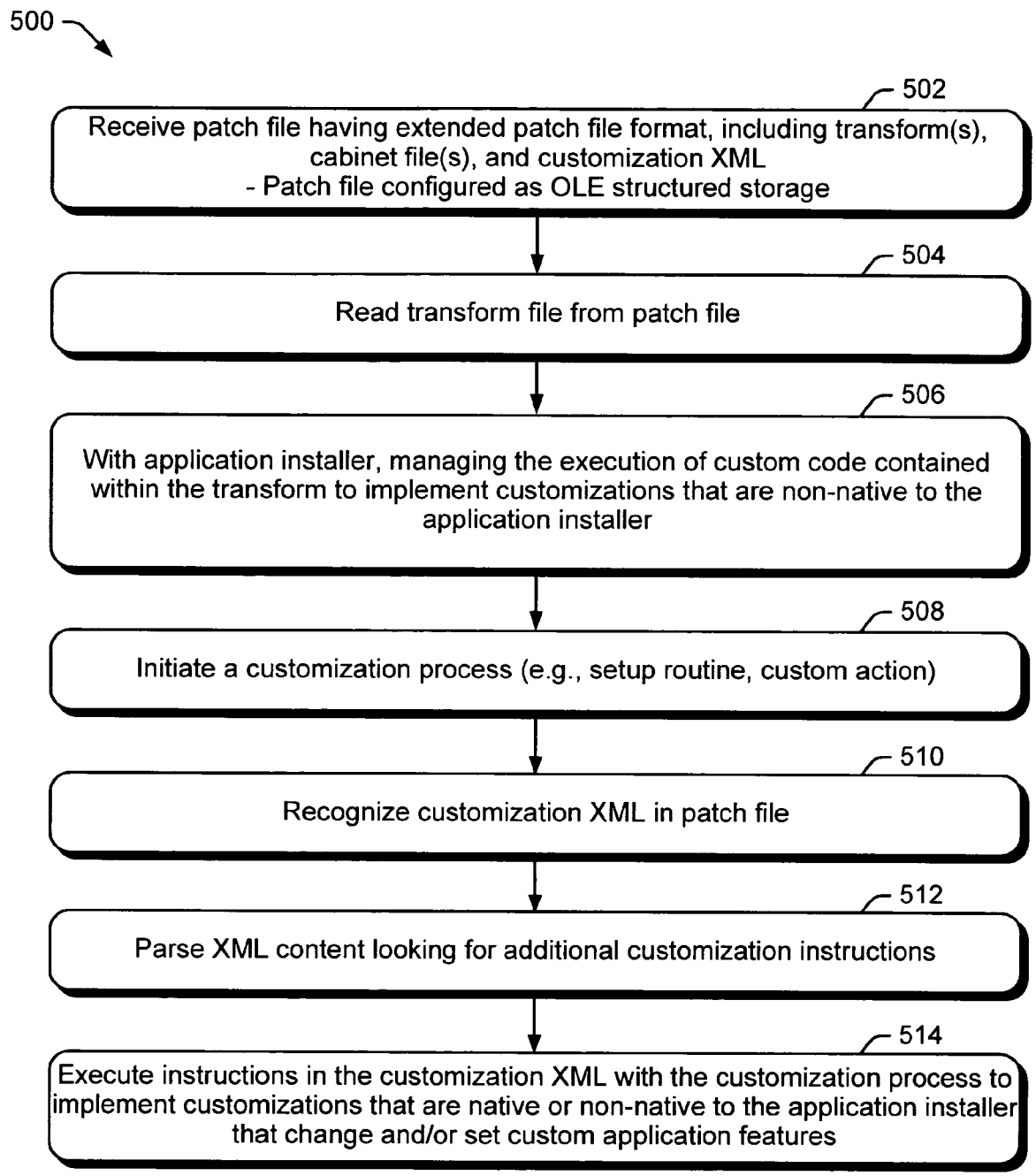
FIG. 5 is a flow diagram illustrating additional exemplary methods for implementing application customizations through patches.

Example methods for implementing application customizations through patches will now be described with primary reference to the flow diagrams of FIGS. 4 and 5. The methods apply generally to the exemplary embodiments discussed above with respect to FIGS. 1-3. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Method 400 is an example method for implementing application customizations through patches. At block 402 of method 400, a patch file is received on a computer 102. The patch file is a customization patch file that contains customization information for customizing an application on computer 102. The customization information in the patch file is contained in one or more transform files, cabinet files, and XML content. The transform files contain the customizations to be applied to an application installation package, while the cabinet files contain data related to the customizations that is used to update the customizations. The XML content provides a road map of the customizations contained in the transform files. The XML content is a generic expression of a user's customization intent, and can include additional customization information not found in the transform files. The contents of the patch file (i.e., transform files, cabinet files, XML content) are generally structured in a compound document format such as Microsoft's OLE structured storage format.

At block 404, after receiving the patch file, an application installer reads a transform file from the patch file in a manner consistent with its native patch functionality. At block 406, the application installer applies the transform and a corresponding cabinet file to an application installation package. Application of the customizations contained in the transform and the data from the cabinet file implement customizations in the application that are native to the functionality of the application installer 206. The customizations set or make changes to custom features in the application according to a user's or administrator's desires.

The method continues at block 408 where a customization process is initiated. The customization process is independent of the application installer 206. The customization process enables application customizations to be implemented based on additional customization information contained within the XML content. Because the application installer 206 is not designed to recognize the XML content, it ignores the XML content. However, the separate customization process on computer 102 is configured to recognize the presence of the XML content in the patch file as shown at block 410. At block 412, the customization process parses the XML content looking for additional customization instructions. The customization instructions are executed at block 414 to implement customizations that may be native or non-native to the application installer 206. As indicated at block 408, the customization process can be implemented in a number of ways. For example, the customization process can be configured as part of the application setup routine or a particular execution mode of the application setup routine. The customization process might also be configured as one or more stand-alone custom actions installed on computer 102 from the application installation package.

Method 500 is another example method for implementing application customizations through patches. At block 502 of method 500, a patch file is received on a computer 102. As in the method 400 above, the patch file is a customization patch file that contains customization information for customizing an application on computer 102. The customization information in the patch file is contained in one or more transform files, cabinet files, and XML content. However, in this method, a custom code technology is used to implement the customizations. The transform file(s) contains custom code configured to implement customizations that may be non-native to the application installer 206. That is, customizations that the application installer 206 may not be designed to implement can be implemented through the use of custom code contained in a transform file that is configured to implement such a non-native customization.

At block 504, the application installer reads the transform file in the patch file. The application installer then manages the execution of the custom code in the transform, as shown at block 506. Execution of the custom code implements the customizations that may be non-native to the application installer 206.

The method 500 then continues in a manner similar to method 400, where a customization process may be initiated (block 508) to recognize customization XML in the patch file (block 510) and to parse the XML content for customization instructions (block 512). At block 514, instructions from XML content within the patch file are executed to implement customizations that may be native or non-native to the application installer 206.

Application customizations can be implemented using a patch file at virtually any time. For example, application customizations can be implemented during the deployment or installation of an application onto one or more computers. Application customizations can also be implemented at anytime, and in any number, after installation of the application onto the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for customizing an application implemented at least in part by a computing device comprising:
   receiving an Object Linking and Embedding (OLE) structured storage patch file containing a transform file, wherein the transform filed comprises custom code, a cabinet file, and XML content; and
   customizing an executable application with an application installer according to the information contained in the received patch file, the customizing comprising making changes to one or more features of the executable application, wherein the customizing differs from native functionality of the application installer.

2. A method as recited in claim 1, wherein the customizing comprises applying a transform file contained within the patch file to an application installation package.

3. A method as recited in claim 1, wherein customizing the application comprises executing XML contained within the patch file to implement a customization process previously installed from an application installation package and configured to recognize and execute the XML.

4. A method as recited in claim 3, wherein implementing a customization process is selected from the group comprising:
   executing a setup routine configured to recognize the XML, parse the XML for customization instructions, and execute the customization instructions; and
   executing a custom action configured to recognize the XML, parse the XML for customization instructions, and execute the customization instructions.

5. A method as recited in claim 1, wherein customizing the application is customizing the application in a manner selected from the group comprising:
   customizing the application during installation of the application; and
   customizing the application after installation of the application.

6. One or more processor-readable storage media having processor-executable instructions configured for:
   receiving an Object Linking and Embedding (OLE) structured customization patch file having extended patch file format, including a transform file, a cabinet file, and XML content, wherein the transform file contains custom code that directs an application installer to make a particular customization to an application the customization comprising enabling a feature of the application, wherein the customization differs from native functionality of the application installer;
   parsing the customization patch file to locate application customization information, the parsing comprising recognizing the transform file, the cabinet file, and the XML content within the customization patch file; and
   implementing the customization to the application, wherein changes to one or more features of the application are made based on the application customization information in the customization patch file.

7. One or more processor-readable storage media as recited in claim 6, wherein implementing an application customization is implementing an application customization in a manner selected from the group comprising:
   implementing the application customization by executing custom code within the transform file; and
   implementing the application customization based on information in the XML content.

8. One or more processor-readable storage media as recited in claim 6, wherein implementing an application customization comprises implementing an application customization during an installation of the application.

9. One or more processor-readable storage media as recited in claim 6, wherein implementing an application customization comprises implementing an application customization after an installation of the application.

10. A computer comprising the one or more processor-readable storage media as recited in claim 6.

11. A computer comprising:
    a processor; and
    one or memory devices coupled to the processor, wherein the one or more memory devices are encoded with:
      an Object Linking and Embedding (OLE) structured customization patch file having information for customizing an application, the information comprising:
        a transform file, wherein the transform filed comprises custom code;
        a cabinet file; and
        customization XML; and
      an application installer configured to customize the application based on the information in the customization patch, wherein the application installer is configured to execute the custom code to implement a customization, and wherein the customization differs from native functionality of the application installer and wherein, when the application installer installs the application for which the customization patch has information for customizing, the information in the customization patch is used to customize the application with customization comprising:
        adding a new application feature;
        changing a setting of the application; and
        changing an operating characteristic of the application.

12. A computer as recited in claim 11, further comprising an application installation package, wherein the application installer is configured to apply customizations contained in the transform file to the application installation package.

13. A computer as recited in claim 12, further comprising a customization process configured to parse the customization XML and implement application customizations according to instructions within the customization XML.

14. A computer as recited in claim 13, wherein the customization process is selected from a group comprising:
    an application setup routine; and
    a custom action installed from the application installation package.

* * * * *